United States Patent [19]

Lindsey

[11] Patent Number: 5,154,158
[45] Date of Patent: Oct. 13, 1992

[54] COOLER AND GRILL COMBINATION

[76] Inventor: Don R. Lindsey, 8213 S. Richmond, Chicago, Ill. 60652

[21] Appl. No.: 723,446

[22] Filed: Jun. 19, 1991

[51] Int. Cl.⁵ ............................................. F24C 1/16
[52] U.S. Cl. ................... 126/9 R; 126/25 R; 62/331; 62/457.7
[58] Field of Search ............. 126/9 R, 9 B, 37 R, 126/37 A, 37 B, 29, 30, 25 R, 266, 265, 261; 206/541, 542, 546; 62/331, 457.1, 457.7, 371; 220/54, 345, 346, 343, 3.1; 99/357

[56] References Cited

U.S. PATENT DOCUMENTS

| | | | |
|---|---|---|---|
| Re. 32,740 | 8/1988 | Steffes | 312/351 |
| 761,047 | 5/1904 | Hays | 126/266 |
| 832,789 | 10/1906 | Harding | 126/266 |
| 935,692 | 10/1909 | Ryding | 126/265 |
| 985,020 | 2/1911 | Edwards | 206/542 |
| 1,244,407 | 10/1917 | Avedisian et al. | 126/37 B |
| 1,524,961 | 2/1925 | Asche | 62/331 X |
| 2,143,239 | 1/1939 | Foltz | 126/37 R |
| 2,787,891 | 4/1957 | Hengehold | 220/529 X |
| 2,860,624 | 11/1958 | Eddy | 126/25 R |
| 3,094,113 | 6/1963 | Avila | 126/9 R X |
| 3,478,676 | 11/1969 | Schulze | 99/357 |
| 4,213,310 | 7/1980 | Buss | 62/457.7 X |
| 4,571,740 | 2/1986 | Kirby et al. | 62/457.7 X |
| 4,667,484 | 5/1987 | Tarozzi et al. | 62/457.7 X |
| 4,747,490 | 5/1988 | Smith | 206/542 |
| 4,895,068 | 1/1990 | Hanagan et al. | 99/357 |
| 5,048,505 | 9/1991 | Hait | 126/9 R |

FOREIGN PATENT DOCUMENTS 0267839  11/1988  Japan ...................... 126/9 B Primary Examiner—Carl D. Price
Attorney, Agent, or Firm—Richard C. Litman

[57] ABSTRACT

A portable cooler stores a knockdown barbecue cooker within. The cooker includes a flat wire mesh grill, a round pan to hold hot charcoal beneath the grill, and three legs to join the pan and grill and support them above a surface. The legs insert through slots in the sides of the pan and clip onto the grill. When disassembled and cool, the legs and grill fit into a recess on the top side of the cooler lid, and are then enclosed by a slide-on cover. The floor of the recess includes protrusions with lips into which the legs snap. The grill and pan share a common perimeter outline; the outline and depth of the recess are adapted to hold them within.

8 Claims, 1 Drawing Sheet

COOLER AND GRILL COMBINATION

FIELD OF THE INVENTION

The present invention relates to portable coolers (insulated containers) with additional storage for non-refrigerated items.

DESCRIPTION OF THE PRIOR ART

Portable coolers are very commonly used for maintaining food at a temperature higher or lower than ambient temperature. Since they are usually used for keeping things cold, the name "cooler" has become common. These devices are also known as "refrigerators" and "ice chests".

The typical modern construction of a cooler employs double-walled sheet metal or plastic with insulating material, such as expanded foam, between the plastic walls. The cooler is typically rectangular in shape. There are usually two separable parts, the open-topped cooler body proper and the covering lid. The lid may be hinged to the body or may simply lift off.

The prior art shows various modifications to portable coolers. Some combine a cooler with another device, such as a radio (Kirby et al. U.S. Pat. 4,571,740) or a golf club rack (Smith U.S. Pat. No. 4,747,490). Others include additional storage space.

Tarozzi et al. show a cooler with a lid which is hollow for holding articles not to be refrigerated. The lid is of the unhinged type which lifts off the open top of the cooler, and is clamped on with cams on a U-shaped carrying arm when the arm is upright. The lid has a compartment with its own separate cover. The cover opens on the top.

Buss, in U.S. Pat. No. 4,213,310, teaches a variation on the Tarozzi et al. idea: a cooler with a flask mounted inside the lid. The cover lid of the cooler is hinged; when the lid is rotated up, the flask is accessible on the underside. The flask is specially designed to fit into a recess on the inside of the cover, which is thick. The flask is removably held in the cover recess when not in use.

U.S. Pat. Re. 32,740 of Steffes shows a cooler with a movable shelf. The shelf is configured and adapted to mount on both the inside and the outside of the cooler for supporting food and drinks, and can also act as a partition within the cooler when vertically slid into one of various pairs of slots in the longer internal side walls of the cooler chest.

Since food is cooked or grilled at picnics, where coolers are frequently used, several inventors have attempted to combine a cooler with a grilling cooker device (commonly known as a "grill" despite the fact that the grill proper comprises solely the wire mesh on which the food is placed, and does not include the other parts of the cooker, such as the heat source, handles, and so on).

U.S. Pat. No. 2,787,891 issued to Hengehold describes a combined refrigerator and cooking pan, all of sheet metal. The refrigerator uses "salt brine" tanks, apparently working on a combination of ice and salt: Compartments above the salt brine tanks contain refrigerated vegetables, and a roast is contained in a central compartment. To cook the roast, the entire structure is put into an oven. The salt brine evaporates to steam the vegetables while the roast is cooking.

The scheme of placing a refrigerator into an oven involves obvious thermal inefficiency. Unless a separate additional cooler is also used, no provision for chilled items is left after the Hengehold device is roasted.

Schulze U.S. Pat. No. 3,478,676 describes a combination cooler and fire box. The open-top metal fire box, with a row of ventilation holes circumscribing the lower edge, is topped by a grate. Food to be cooked is put on the grate, and a fire is built at the bottom, within the fire box. When the fire box has cooled, an insulated cooler, slightly smaller in dimension than the fire box, can be inserted into the fire box for storage and transport.

This invention has the disadvantage that the outside of the cooler contacts the inside of the fire box when stored within, so that the cooler is likely to be soiled by ashes and soot. The fact that the fire box is on the outside also means that users are likely to get smudged when carrying the combined unit. The storage of the cooler within the fire box has the further disadvantage that the fire box must have a greater volume than the cooler: but usually such a large fire box is not needed, as the amount of cooked food is usually small compared to the volume of chilled foods and drinks needed at a picnic. Another drawback is that the fire box, as well as having an excessive volume, must be quite deep to hold the cooler. This puts the food too far from the coals and thereby wastes heat, slows cooking, and requires extra metal in the fire box walls. The extra metal both costs more and weighs more.

Hanagan et al. combine a large covered grill with a small cooler in U.S. Pat. No. 4,895,068. A single metal bent-tube frame holds a gas grill and a cooler alongside the gas grill. A corrugated metal sheet is placed in between the cooler and the grill to insulate the cooler from intense radiant heat from the side of the grill. Both the grill and the cooler are held a few inches above a surface by the frame.

Since both the grill and the cooler will most likely be used on a table, this invention seems to increase the expense of having both a grill and cooler (due to the cost of the frame and insulation) while providing little or no gain in convenience. The close proximity of the grill and cooler invites fast warming of chilled food in the cooler. The bulk of the combination is greater than that of either item individually. The increased bulk and weight make the Hanagan invention difficult for one person to carry, so there may be no advantage in portability. The large and heavy covered gas grill shown by Hanagan et al. will cool slowly and require the users to wait before packing up.

Neither Hengehold, Schulze, nor Hanagan et al. show any combination of a cooler with a cooking grill which is compact, light in weight, clean, and easy to use.

None of the above inventions and patents, taken either singly or in combination, is seen to describe the instant invention as claimed.

Accordingly, one object of the present invention is a combination of a grill and cooler which is compact and light in weight.

Another object is a combination of a grill and cooler in which a small knockdown grill fits within a cooler.

Still another object is a combination of a grill and cooler which keeps grill ashes and soot away from people and clothing when the grill is stored.

A further object is a combination of a grill and cooler which is attractive in appearance.

These and other objects of the present invention will become readily apparent upon further review of the following specification and drawings.

SUMMARY OF THE INVENTION

The present invention combines a cooler with a knockdown grill cooker (wire mesh grill plus supports and heat source). The grill cooker is small and fits into a compartment in the cooler lid when disassembled and cooled from use. A cover slides over the cooker to hide and contain the cooker parts within the lid. The cooler is conventional except for the lid.

The cooker consists of three parts. The first is a round, flat wire mesh grill with a wire loop handle extending from the side. The second is a round pan, much like a pie tin, of the same diameter as the round grill, to hold hot coals under the grill for cooking. The third is a set of three metal legs for supporting and joining the pan and the grill.

The three legs slide through and lock into passages in the vertical sides of the pan. The passages may be formed by cutting slots in the pan side and bending the metal strips between them alternately in and out. The tops of the legs clip to the grill; the bottoms rest on the ground or support surface.

The assembled cooker has the three legs vertical and equally spaced about the perimeter of the circular grill, which is held horizontally atop them. The coal pan is held horizontal below the grill partway between the support surface and the grill.

The lid contains a recess in its upper surface which is adapted to hold the disassembled cooker when it has cooled from use. The shape and depth of the recess allow the grill and pan to fit snugly within the recess. The floor of the recess is flat and includes clips to hold the legs in place to prevent rattling.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
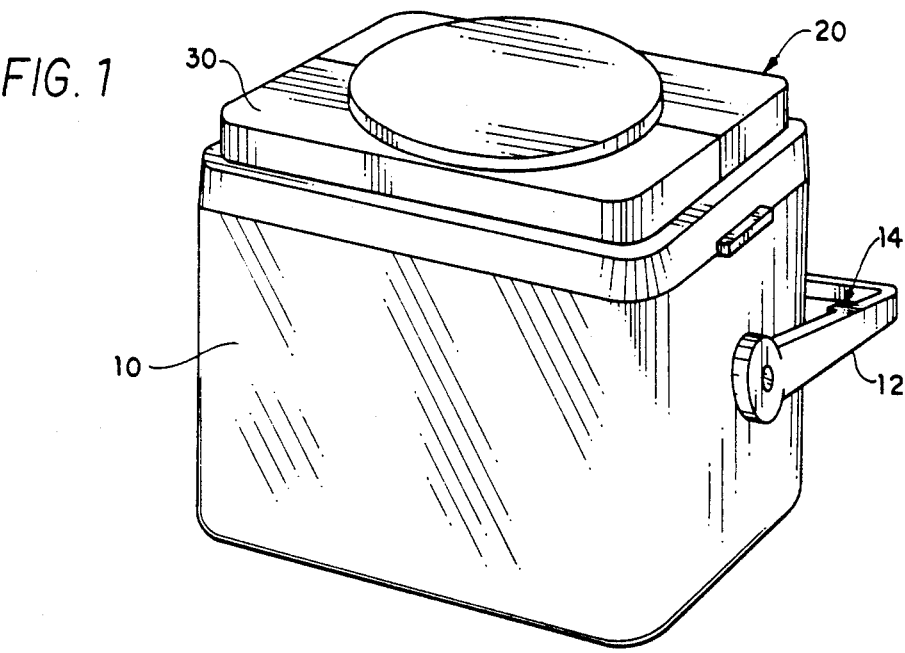
FIG. 1 shows the cooler of the present invention in perspective view.

The present invention, a cooler and knockdown grill cooker combination with storage for the cooker in the lid of the cooler, is shown in FIG. 1. As will be apparent from viewing FIG. 1, the cooler is similar in appearance to other coolers. The cooler may be about 14 inches wide by 19 inches long. The cooler includes a generally rectangular lower container portion 10 with insulating walls for holding food or beverages and keeping them hot or cold. The cooler also includes a U-shaped, hinged carrying handle 12 and a lift-off lid 20. To hold the lid 20 onto the top of the container 10, a projection 28, extending outwardly from the lower skirt of the lid 20, locks against a cam 14 extending inwardly from the handle 12. As the handle 12 rotates about the axis of its hinged attachment to the container 10, the cam grazes the projection 28 to hold the lid 20 onto the open top of the container 10. The lid 20 also includes means for locating it in place on the open top of the container 10, for example, a protruding lower part which inserts a short distance into the container 10 opening (not shown).

Figure 2:
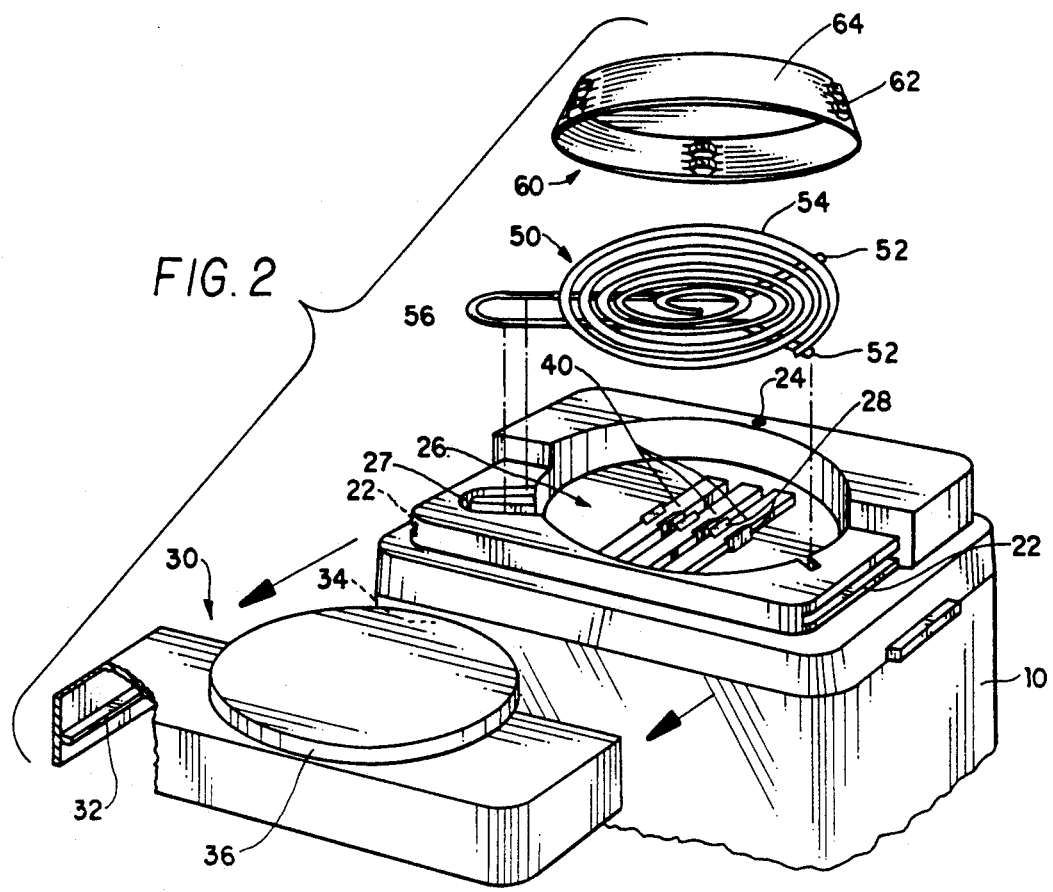
FIG. 2 is an exploded, partial cutaway view of the cooler of FIG. 1. The cover is exploded out horizontally, and the grill and pan are exploded out vertically.

In FIG. 1, a separation line is seen to run across the top of the lid 20. In FIG. 2, a cover 30 is shown exploded out of the lid 20. The two parts 20, 30 abut when assembled.

Still referring to FIG. 2, the cover 30 is seen in the cutaway section to include two rails 32 along two lower edges. (One rail 32 is hidden in FIG. 2.) These rails 32 slide in grooves 22 on the lid 20, which hold the cover 30 onto the lid 20 but allow sliding separation. To prevent the cover 20 from inadvertently sliding off the grooves 22, a lock may be used. If the cover 30 is molded of plastic, which is the preferable material, a notch or depression 24 may be molded in the lid 20 (also preferably of plastic), and a nub 34 may be molded into a corresponding position on the underside of the cover 30. The round part 36 of the cover 30 will deflect when slid on to allow the nub 34 to come to rest inside the depression 24.

When the cover 30 is slid off of the lid 20, the knockdown grilling cooker apparatus is exposed, and may be removed for assembly and use. The cooker is never used on or near to the cooler; it is removed, assembled, used, cooled, and inserted back into the lid 20. The cooker cools in about a minute's time. The cooker includes three legs 40, a grill 50, and a coal pan 60 for holding the hot embers or coals used for cooking, which might be charcoal, wood, or other material. All of these parts may be made of steel, or other strong, heat-resistant material.

The legs 40 may be 10 inches long, 1/16 inch thick, and 1 inch wide. They insert through the slots 62 in the nearly vertical side rim 64 of the pan 60. The legs 40 include notches cut into their sides to clip onto the grill 50 and the pan rim 64. When assembled, the legs hold the grill about 10 inches off the surface on which the assembly rests; the pan is about three inches below. The pan rim 64 is about two inches wide, so the bottom plate of the pan is approximately 5 inches off the surface.

Ventilation holes (not shown) may be provided in the bottom plate of the coal pan 60 to admit air to the coals.

All parts of the cooker are held snugly within a recess 26 in the lid 20, and are covered by the round part 36 for storage. The three legs 40 are held by clips 28 on the flat, circular floor of the recess 26. The legs 40 snap in and out of the clips 28.

Shown over the recess 26 is the grill 50. It is preferably made of two lengths of heavy-gauge steel wire bent to shape and then welded or brazed. The grill is generally disc-shaped with a protruding handle. It comprises a spiral mesh 54 fastened to a bent-wire Y frame 52. The bottom of the Y is doubled wire and extends past the circular perimeter of the mesh 54 to form a handle 56 for lifting the grill 50 when it is hot. The handle 56, outside of the heated area of the grill 50, will be air-cooled to a comfortable temperature.

The grill 50 fits into the circular main part of the recess 26, and the inverted pan 60 fits over it. The depth of the recess is such that the cover 30 will graze the bottom plate of the pan 60 as it slides over the grooves 22. This, along with a close match in diameters between the recess 26 and the grill 50, and between the recess 26 and the pan 60, prevents rattling To accommodate the handle 56 the recess 26 includes a U-shaped slot 27 extending from the main circular part of the recess.

The present invention has the advantage that the cooker parts, which must be of metal to resist heat, are held snugly and will not rattle or bang. Any soot on the cooker after use will cause no problems, as the plastic cover prevents the soot from smudging objects. The inside of the cover is easily washed. No separate container needs to be brought along, or washed. Also, the inclusion of the cooker prevents a picnicker from forgetting to bring the cooker along; the cooler is much larger and harder to forget.

It is to be understood that the present invention is not limited to the sole embodiment described above, but encompasses any and all embodiments within the scope of the following claims.

I claim:

1. A combination cooler and knockdown cooker, said cooker for grilling food, comprising:
   an insulated open-top container;
   a removable lid, for closing said container, including means defining an upwardly open recess therein;
   disassembled cooker parts within said recess of said removable lid; and
   a cover removably attached to said lid to enclose said recess and enclose said cooker parts; whereby, when said cover is in a closed position, said cooker is hidden within said recess;
   said removable lid further including a first track member means and said cover including a second track member means, mating with said first track member means, for sliding engagement of said lid with said cover, whereby said cover is removably attached to said lid.

2. The combination according to claim 1, wherein said cooker parts include:
   an open mesh grill;
   a coal pan having a bottom plate and a side rim extending above said bottom plate; and
   support means for holding said pan above a supporting surface and for holding said grill above said pan.

3. The combination according to claim 2, including a handle on said grill.

4. The combination according to claim 2, wherein said pan and said grill are dimensioned to have congruent perimeter outlines and said support means includes a plurality of elongated legs;
   means for attaching said legs to said pan at a corresponding plurality of pan perimeter points.

5. The combination according to claim 4, wherein each one of said plurality of pan perimeter points includes means defining a row of leg receiving slots.

6. The combination according to claim 4, wherein said congruent perimeter outlines are circular.

7. The combination according to claim 6, including a handle extending beyond the perimeter outline of said grill.

8. The combination according to claim 1, including a lock to prevent said cover from sliding from said lid.

* * * * *